United States Patent
Mustalahti et al.

(10) Patent No.: US 7,370,748 B2
(45) Date of Patent: May 13, 2008

(54) CONVEYOR

(75) Inventors: Jorma Mustalahti, Hyvinkää (FI); Esko Aulanko, Hyvinkää (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 11/416,170

(22) Filed: May 3, 2006

(65) Prior Publication Data
US 2006/0225988 A1    Oct. 12, 2006

Related U.S. Application Data

(63) Continuation of application No. PCT/FI2004/000644, filed on Nov. 1, 2004.

(30) Foreign Application Priority Data
Nov. 3, 2003  (FI) .................................. 20031591

(51) Int. Cl.
B65G 15/00 (2006.01)
(52) U.S. Cl. ................. 198/321; 198/502.1
(58) Field of Classification Search ............... 198/321, 198/326, 502.1
See application file for complete search history.

(56) References Cited

U.S. PATENT DOCUMENTS

| 4,565,276 A | 1/1986 | Dengs et al. |
|---|---|---|
| 4,645,059 A | 2/1987 | Höfling et al. |
| 4,756,398 A | 7/1988 | Watanabe et al. |
| 5,176,239 A | 1/1993 | Findlay et al. |
| 5,427,227 A * | 6/1995 | Crandall et al. ......... 198/502.1 |
| 6,044,961 A * | 4/2000 | Hine ....................... 198/502.1 |
| 6,085,891 A | 7/2000 | Behle |
| 6,607,064 B2 * | 8/2003 | Inoue ........................ 198/324 |
| 6,698,577 B1 * | 3/2004 | Conklin et al. .......... 198/502.1 |
| 6,910,293 B1 * | 6/2005 | Armstrong et al. ...... 198/502.1 |
| 2004/0035674 A1 * | 2/2004 | Inoue ......................... 198/321 |
| 2004/0226804 A1 * | 11/2004 | Conklin et al. .......... 198/502.1 |
| 2005/0279610 A1 * | 12/2005 | Ossendorf ................. 198/321 |

FOREIGN PATENT DOCUMENTS

| EP | 1 157 957 | 11/2001 |
|---|---|---|
| EP | 1 190 976 | 3/2002 |
| JP | 58 100080 A | 6/1983 |
| JP | 2000-247564 | 9/2000 |
| WO | WO-00/66476 | 11/2000 |

* cited by examiner

*Primary Examiner*—James R. Bidwell
(74) *Attorney, Agent, or Firm*—Venable LLP; Robert Kinberg; Steven J. Schwarz

(57) ABSTRACT

A pallet arrangement for a travelator comprises a pallet body comprising a profiled bar having a predetermined size, at least one surface plate attached to the pallet body and forming a wearing surface, a wheel mounted on at least one end of the pallet body, and a fastening element mounted on at least one end of the pallet body. The fastening element is adapted to couple the pallet to an actuating device.

12 Claims, 2 Drawing Sheets

CONVEYOR

CROSS-REFERENCE TO RELATED APPLICATIONS

This application is a continuation of the U.S. National Phase designation of International Application No. PCT/FI2004/000644, filed on Nov. 1, 2004, which claims priority of Finnish Application No. FI20031591, filed on Nov. 3, 2003. The entire contents of the aforementioned applications are incorporated herein by reference in their entirety.

BACKGROUND OF THE INVENTION

The present invention relates generally to a pallet arrangement for a travelator or equivalent. Like escalators, travelators are conveying devices designed to move people or goods. They differ from escalators, e.g., in that they often work in a substantially horizontal position or in a slightly inclined position relative to their direction of motion so that successive steps, i.e., pallets, form a substantially even and rectilinear track instead of stair-like steps as in escalators. Travelators are also referred to as moving side-walks and autowalks.

In prior-art travelators, autoramps and escalators, the pallets are typically made from aluminum or other suitable metal or alloy pressure-molded as a single piece. A problem with these constructions is that the pressure-molding tools applicable for this purpose are very expensive. A further problem is that separate, expensive tools are needed for each step or pallet type and for each width.

In addition, prior-art pallet constructions have, e.g., plastic comb strips or the equivalent used as decorative or warning elements. A problem with these solutions is that mounting the comb strips is a difficult and time-consuming operation because in prior-art constructions they are generally fastened by means of screws to the routed edges of the steps or pallets.

Another known technique in prior-art pallet structures is to illuminate the gap between steps or pallets from below to warn about the approaching end of the moving track of the travelator. However, a problem is the narrow width of the gap, which in prior-art solutions is generally only about three to six mm wide. Therefore, the warning light has a weak attention-getting effect, which is why the warning is easily overlooked.

SUMMARY OF THE INVENTION

An object of the present invention is to overcome the above-mentioned drawbacks and provide an easily variable pallet structure of economical cost for use in a travelator, autoramp, escalator, or equivalent. Another object is to provide a pallet structure having safety-improving solutions and various visual functions, such as the presentation of information or advertisements. Yet another object is to provide a pallet structure that is quickly and economically maintained due to the surfacing part being easily replaceable. Still another object is to provide a pallet structure that permits the replacement of only the worn-out parts, making it unnecessary to replace the entire pallet due to wear of the surfacing.

According to one exemplary embodiment of the invention, a pallet arrangement for a travelator comprises: a pallet body comprising a profiled bar having a predetermined size; at least one surface plate attached to the pallet body and forming a wearing surface; a wheel mounted on at least one end of the pallet body; and a fastening element mounted on at least one end of the pallet body, the fastening element adapted to couple the pallet to an actuating device.

Some advantages of the pallet arrangement of the invention include low manufacturing costs and a surface structure consisting of easily variable surfacing parts. Another advantage is that user safety is improved, because the lighting effects indicating the end of the moving track can be easily implemented so that they are more visible than in prior-art designs. User safety is also improved because the gaps between steps or pallets can be sealed better than in prior-art designs. A further advantage is that the surface of the pallets can be better used as a displaying surface for notices or advertisements. Another advantage is that maintenance of the equipment becomes easier and cheaper because only the surfacing parts subject to wear need to be replaced. An additional advantage is that the surfacing parts are fastened to the body of the step or pallet by profile-locked snap-on couplings or equivalent that can be easily released and locked, allowing the joints to be easily uncoupled using a suitable tool. Another advantage includes small investments on tools, because the pallets can be cut to a suitable length from extruded long profiles, or their surfacing parts can be easily and quickly replaced with a structure of some other type or shape if desirable.

In a preferred embodiment of the invention, the pallet body is made from an extruded profile or comprises some other suitable profile structure, and the profile shape includes fastening points for mounting wheels as well as fastening elements for transmitting the driving power needed to move the pallets. The wheel or fastening element (which can be attached to a chain or other means transmitting driving power to the pallet), is preferably connected to a fastening point in the pallet via a knuckle pin or equivalent. With respect to the moving direction of the pallet, the fastening point is located between the frontmost wheel and the rearmost wheel, preferably at the same level with the axles of the wheels. The body itself is preferably rigid enough to receive all the strain imparted by the load and the movement of the pallet on its track. The knuckle pins or other fastening means and the cover plates of the pallet can also contribute towards increasing the rigidity of the body.

BRIEF DESCRIPTION OF THE DRAWINGS

The present invention will now be described in detail with reference to an exemplary embodiment, referring to the attached drawings, wherein.

DETAILED DESCRIPTION OF THE PREFERRED EMBODIMENTS

Figure 1:
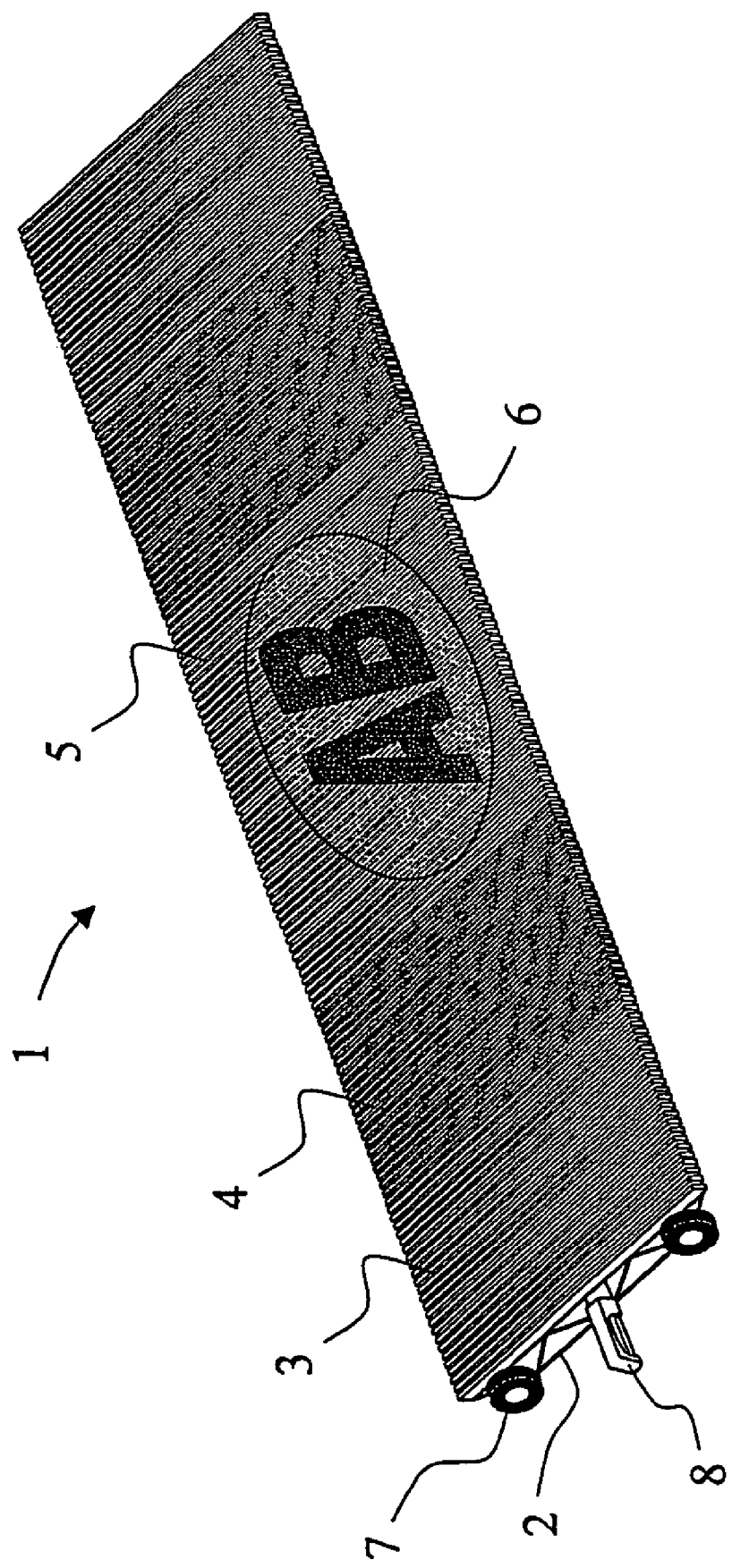
FIG. 1 is a top, perspective view of an exemplary pallet according to the present invention.
Figure 2:
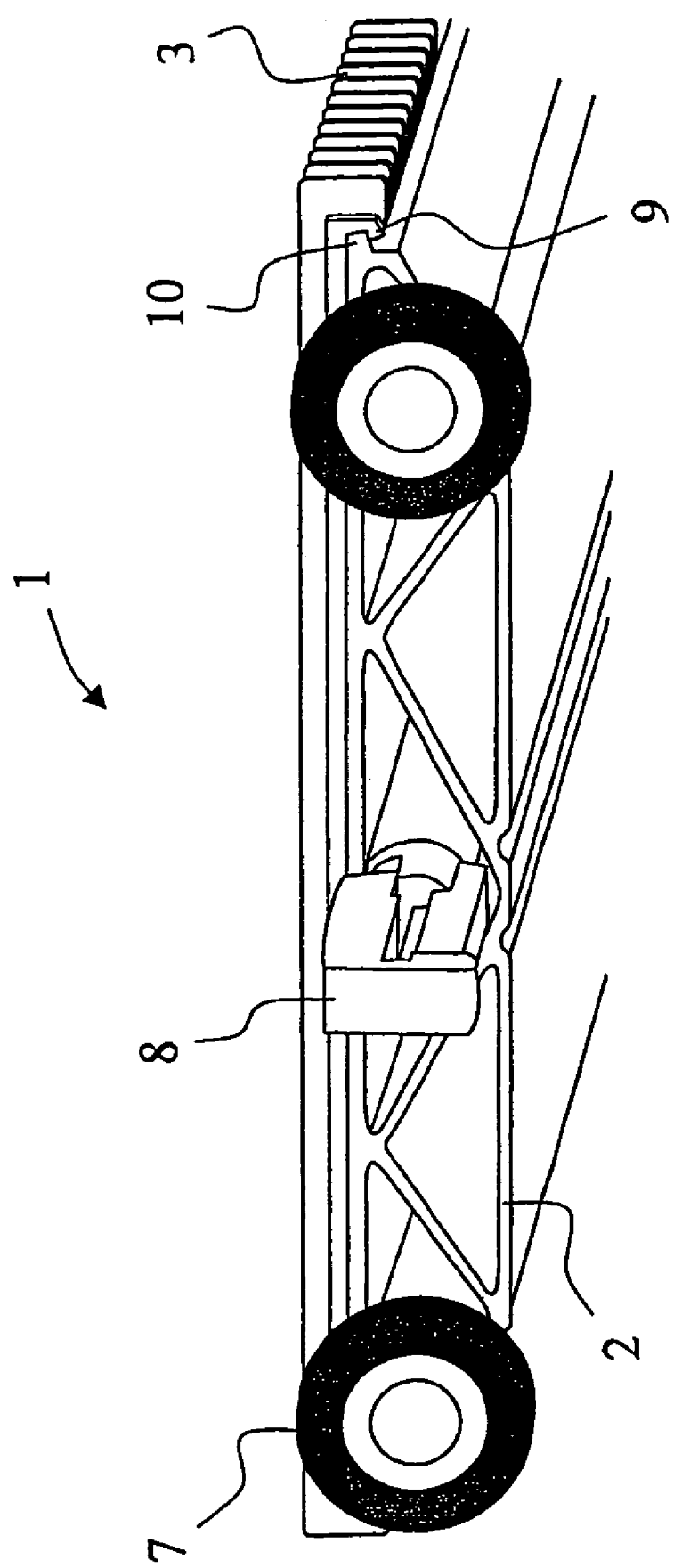
FIG. 2 is an end, perspective view of the pallet of FIG. 1.

Referring to FIGS. 1 and 2, the pallet structure 1 of the present invention comprises a pallet body 2. The pallet body 2 is preferably made by extruding a suitable profile from aluminum or some other appropriate metal or alloy. In manufacturing the pallet body 2, a suitable profile is extruded in bars of a length well suited for manufacture, transportation, or other purposes. From these profiled bars, parts having a length appropriate for the specific application are later cut during manufacture of the pallet. Thus, the same profile can be easily used to make pallets of different widths, allowing the width of the moving track of the travelator to be easily varied. Wheels 7 are attached to each end of the pallet body 2. Additionally, a fastening element 8 is attached to at least one end, and preferably at both ends. The fastening element 8 couples the pallet 1 to an endless cogged belt or chain or an equivalent actuating device serving to move the pallets.

A surface part, preferably comprising one or more surface plates 3-5 of suitable width, is fastened onto the body 2 of the pallet 1 by means of, e.g., snap-on couplings or similar shape-locked couplings. The surface part can be extruded from plastic or a similar material. The surface part can contain corrugations extending in the direction of the track of motion of the pallets 1. Each surface plate 3-5 can include snap-on coupling elements or similar coupling elements 9. The coupling elements 9 are preferably placed in the lower part or lower surface of the surface plates 3-5 at suitable points, e.g., at the ends and the middle part of the surface plates 3-5, so that the surface plates 3-5 remain firmly in place on the body 2 of the pallet 1, and so that the surface plates 3-5 can be easily pressed into position and likewise easily released from the body 2 by means of an appropriate tool. Counterparts 10, which correspond in location to the coupling elements 9, are located at suitable points substantially in the upper part of the body 2 of the pallet. The counterparts 10 can be fastened to the coupling elements 9, e.g., by a shape-locked coupling.

The width of the surface plates 3-5 is preferably so defined that, using a suitable number of surface plates of the same width, it is possible to cover pallet bodies of various widths, allowing the same parts to be used to assemble pallets of various widths. The surface plates may also differ in width from each other. For example, the surface plates located at the outer edges of the pallet may have a different width than the other surface plates. In addition, some surface plates may have a different structure and/or coloring. Some surface plates can have special patterning pieces whose pattern is desired to be continuous without visible boundaries.

FIG. 1 shows a pallet 1 including surface plates 3 and 4 of different colors, as well as a transparent or translucent surface plate 5. Beneath the transparent or translucent surface plate 5 (e.g., between the body 2 and the surface plate 5), it is possible to place, e.g., a notice, advertisement or other visual element, identified by reference numeral 6 in FIG. 1, that varies the appearance of the surface plate. The visual element 6 can be printed on paper, plastic, or similar material, and can be illuminated from below or from the side to produce different visual effects. The transparent or translucent surface plate 5 is preferably placed in the middle part of the pallet 1. By placing surface plates of different colors at different positions in the widthwise direction of the pallet 1, it is possible to vary the appearance of successive pallets, allowing the appearance of the moving track of the travelator to be easily changed and given a different look.

The present invention also allows the gap between successive pallets 1 in the travelator to be made considerably wider than in prior-art solutions, even as much as about ten times wider, depending on the surfacing solutions. As a result, when completely or partly transparent or translucent surface plates are used, the transparent or translucent gap thus formed can be illuminated from below to warn riders, e.g., about the danger posed by the approaching end of the moving track. Because the attention-getting effect of the warning light in the wider gap is very good, passengers concentrated on studying the notices or advertisements or equivalent can be effectively alerted to the danger caused by the approaching end of the moving track. When plastic elements are illuminated from the side, it also possible to produce impressive illumination effects as the light is scattered, e.g., at the crests of the corrugations mentioned above.

When required, a suitable sealing surface or some other applicable sealing structure, such as a sealing lip, can also be easily fastened to the extruded plastic surfacing part 3-5. The sealing structure can be designed to close the gap between successive pallets 1. The use of such a sealing structure improves the operating safety, among other things, and prevents small objects from falling down into the mechanical structures of the travelator.

One of ordinary skill in the art will know that the present invention is not limited to the exemplary embodiment described above, but rather, that it may be varied within the scope of the claims presented below. Thus, not all the above-mentioned elements need necessarily be used on one pallet. For example, a pallet may be provided with only one kind of surface plate. Likewise, the material and method of manufacture of the pallet body may differ from the above description. For example, the pallet body may consist of two or more sections coupled together, so the length of the body in the direction of the pallet track is not limited to the conventionally or easily available maximum size determined by the extrusion or other manufacturing technique. In addition, the size, shape, structure and material of the surfacing parts of the pallets may differ from the above description. Thus, for example, the surfacing part of the pallet may be made of a material other than plastic, such as aluminum or the like.

It will be understood that the above description of the present invention is susceptible to various modifications, changes and adaptations, and the same are intended to be comprehended within the meaning and range of equivalents of the appended claims.

What is claimed is:

1. A pallet arrangement for a travelator, comprising:
   a pallet body comprising a profiled bar having a predetermined size;
   at least one surface plate attached to the pallet body and forming a wearing surface;
   a first wheel mounted on at least one end of the pallet body and a second wheel mounted on the at least one end of the pallet body; and
   a fastening element mounted on the at least one end of the pallet body centered between the first wheel and the second wheel, the fastening element adapted to couple the pallet to an actuating device.

2. The pallet arrangement of claim 1, wherein the profiled bar comprises an extruded structure from metal or alloy that is cut to a predetermined size.

3. The pallet arrangement of claim 1, wherein the profiled bar comprises at least two extruded structures joined together and disposed side-by-side in the longitudinal direction of the travelator.

4. The pallet arrangement of claim 1, further comprising a plurality of surface plates of substantially equal size to one another, wherein the surface plates are extruded from a plastic material.

5. The pallet arrangement of claim 1, further comprising:
   coupling elements located on a lower part of the surface plate; and
   counterpart elements located on a corresponding upper part of the pallet body, wherein the coupling elements and the counterpart elements engage one another with a shape-locked coupling.

6. The pallet arrangement of claim 1, further comprising a plurality of surface plates, wherein at least two surface plates are of different color from one another, and at least one of the surface plates is translucent or transparent.

7. The pallet arrangement of claim 1, wherein the at least one surface plate is translucent or transparent, and further comprising a visual element located between the pallet body and the translucent or transparent surface plate.

8. The pallet arrangement of claim 7, further comprising an illumination device located below the translucent or transparent surface plate and adapted to illuminate the visual element.

9. The pallet arrangement of claim 1, further comprising a sealing structure located on the surface plate, the sealing structure adapted to seal a gap between successive pallets.

10. The pallet arrangement of claim 1, wherein the surface plate comprises an upper surface formed of aluminum.

11. The pallet arrangement of claim 1, wherein a plurality of the pallets form a moving track.

12. The pallet arrangement of claim 1, further comprising at least one wheel located at an opposite end of the pallet body from the at least one end.

* * * * *